United States Patent
Aguado Giraldo

(10) Patent No.: US 11,770,644 B2
(45) Date of Patent: Sep. 26, 2023

(54) MODULAR DATA CONCENTRATOR DEVICE FOR PUBLIC UTILITY METERING SYSTEMS AND METHOD FOR GATHERING AND MANAGING INFORMATION

(71) Applicant: INTEGRATED MEASUREMENT SYSTEMS S.A.S., Cali (CO)

(72) Inventor: Edgar Julian Aguado Giraldo, Cali (CO)

(73) Assignee: INTEGRATED MEASUREMENT SYSTEMS S.A.S., Cali (CO)

( * ) Notice: Subject to any disclaimer, the term of this patent is extended or adjusted under 35 U.S.C. 154(b) by 0 days.

(21) Appl. No.: 17/267,745

(22) PCT Filed: Aug. 12, 2019

(86) PCT No.: PCT/IB2019/056838
§ 371 (c)(1),
(2) Date: Feb. 10, 2021

(87) PCT Pub. No.: WO2020/035774
PCT Pub. Date: Feb. 20, 2020

(65) Prior Publication Data
US 2021/0321176 A1 Oct. 14, 2021

(30) Foreign Application Priority Data
Aug. 11, 2018 (CO) .................. NC2018/0008437

(51) Int. Cl.
*H04Q 9/00* (2006.01)
*H04Q 9/04* (2006.01)

(52) U.S. Cl.
CPC ........... *H04Q 9/04* (2013.01); *H04Q 2209/60* (2013.01); *H04Q 2209/753* (2013.01)

(58) Field of Classification Search
None
See application file for complete search history.

(56) References Cited

U.S. PATENT DOCUMENTS

| | | | |
|---|---|---|---|
| 6,366,217 B1 * | 4/2002 | Cunningham | G01D 4/004 340/637 |
| 7,688,220 B2 * | 3/2010 | Bovankovich | G01D 4/004 702/62 |

(Continued)

FOREIGN PATENT DOCUMENTS

| | | |
|---|---|---|
| EP | 3163311 | 5/2017 |
| ES | 1203511 | 1/2018 |

(Continued)

OTHER PUBLICATIONS

International Search Report and Written Opinion dated Dec. 4, 2019 in corresponding International Application No. PCT/IB2019/056838 and the English Translation of the International Search Report.

Primary Examiner — Curtis A Kuntz
Assistant Examiner — Jerold B Murphy
(74) Attorney, Agent, or Firm — Haug Partners LLP

(57) ABSTRACT

The present invention relates to a modular data concentrator device for AMI (Advanced Measurement Infrastructure) measurement systems, which is interoperable and has the ability to have the communication protocols of multiple brands of meters embedded and has a fully modular structure, in such a way that one or more communication modules can be integrated, depending on the type of communication of each of the meters to be managed. Thus, the device of the invention allows to manage with the same data concentrator, different brands of meters, whether energy, water or gas, regardless of the communication protocol they use and the communication medium they have, which guarantees to any public utility company that when using this modular device, only a single management software will be required, thus guaranteeing having in a single database format the information of all the managed meters.

8 Claims, 4 Drawing Sheets

(56) References Cited

U.S. PATENT DOCUMENTS

| | | | | |
|---|---|---|---|---|
| 7,741,976 B2 * | 6/2010 | Crider | ................... | G06Q 50/06 |
| | | | | 705/412 |
| 2007/0139218 A1 * | 6/2007 | Bovankovich | ......... | G01D 4/004 |
| | | | | 340/870.02 |
| 2007/0139219 A1 * | 6/2007 | Crider | ................... | G01D 4/004 |
| | | | | 700/100 |
| 2008/0117077 A1 * | 5/2008 | Ratiu | ..................... | G01D 4/004 |
| | | | | 340/870.02 |
| 2018/0075548 A1 * | 3/2018 | Madonna | .................. | H02J 9/04 |
| 2018/0367617 A1 * | 12/2018 | Moustafa | ................ | H04L 43/04 |

FOREIGN PATENT DOCUMENTS

| | | |
|---|---|---|
| KR | 101860647 B1 * | 5/2018 |
| MX | 2009 002801 A | 3/2009 |
| SE | 1650963 | 7/2016 |
| WO | WO 2007/139842 A2 | 12/2007 |
| WO | WO 2008/011817 | 1/2008 |
| WO | WO 2008/094296 | 8/2008 |
| WO | WO 2016/058802 | 4/2016 |
| WO | WO 2018/015822 | 1/2018 |

* cited by examiner

MODULAR DATA CONCENTRATOR DEVICE FOR PUBLIC UTILITY METERING SYSTEMS AND METHOD FOR GATHERING AND MANAGING INFORMATION

CROSS-REFERENCE TO RELATED APPLICATIONS

This application is the National Stage entry under 35 U.S.C. § 371 of International Application No. PCT/IB2019/056838 filed on Aug. 12, 2019, published on Feb. 20, 2020 under Publication Number WO 2020/035774 A1, which claims the benefit of priority under 35 U.S.C. § 119 of Colombian Patent Application Number NC2018/0008437 filed on Aug. 11, 2018, the entireties of which are herein incorporated by reference.

TECHNICAL FIELD

The present invention is comprised in the field of devices for the measurement of public services and, more specifically, with the management of meters and the interrelation between the different types of meters, for all types of public services, such as energy, water and gas.

BACKGROUND OF THE INVENTION

Until a few years ago, homes in neighborhoods, in residential units or in offices and warehouses within a building or a shopping center, had their respective energy meter, which was typical and commonly known, that is, a mechanical meter, which had a rotating disk, with a board that indicated with a numbering, the amount of accumulated energy that the meter had registered.

Subsequently, the measurement systems evolved to fully electronic energy meters, for this type of user as previously defined (residences, offices, etc.). At present, meters with communication are already being implemented, that is, they can be interrogated remotely through a means of communication, without the need for an operator of the public utility company to travel to the site to make the reading. Even the cutting and reconnection of the service to the user can be done from the utility company, without having to go to the premises.

The foregoing implies that, in the public utility company (hereinafter PUC) there is specialized management software, which is what allows communication to be established through a means of communication, with each of the energy meters in the users, where the means of communication can be wired or wireless, that is, it can be a telephone line or, to cite the best known case in wireless communications, a SIM card, such as the one found in mobile phones.

Now, by having this system for homes in a neighborhood, for those of a residential unit, or for the premises of a shopping center or building, we would be talking about a system that would involve multiple telephone lines or multiple SIM cards, which complicates operation and raises system operating costs.

Therefore, companies that offer solutions for measurement systems include in their offer a data concentrator, whose function is to collect information from multiple meters in the field, so that there is only communication between the software in the Public Utility Company and the data concentrator, in order to carry out the transmission of information from many meters. This means that if a data concentrator communicates directly with 20 meters, it uses a SIM card as a means of communication with the software in the PUC, which means that 20 SIM cards will no longer be needed, but only one.

This corresponds to a huge benefit for a PUC, due to the additional functionalities offered by the concentrators, such as, for example, serving as a backup for storing the information of the meters with which it communicates.

Thus, in the state of the art, a plurality of disclosures related to this type of device can be found that help to carry out the process of measurement and/or management or control of public utility meters, within which document CO 09-130995 is found that teaches a service meter that can be read by sending a request to read the meter from a meter reading application, which can be located on a service server or at an access point on a network, to a communication module associated with the service meter, wherein the communication module initiates a session with the service meter, makes data requests from the associated service meter, receives responses to data requests from the service meter, and the session ends after receiving all requested data from the meter. Likewise, this document focuses on a system associated with a public utility network that comprises a plurality of service meters capable of reading information from the product meter; a plurality of public utilities network nodes arranged in a public utilities network and capable of interconnecting with the service meters and receive the product meter information from the service meters and transfer the information to a specific network address; where at least one of the service nodes, in response to receiving a meter reading request from a meter reading program: initiates a session with at least one service meter, makes a plurality of requests for meter data or at least one service meter, receives response to meter data requests from the service meter, formats the received responses to meter data requests into a meter reading request response, and transmits the meter read request response to a specific network address associated with the received meter read request.

Another related Colombian patent application is NC2016/0004508, which defines a data collector system for reading energy meters that has a data collection device that includes a power module connected to a control unit and this in turn is connected to a main peripheral module and an auxiliary peripheral module, the control unit via UART and input/output pins connected to an RS-485 communication interface module including a MUX/DEMUX multiplexing module 8 to 1, wherein the communication between the control unit and the communication interface module is established under IEC 62056-21 protocols or a MODBUS RTU, and the data transfer between the control unit and the HTTP-web interface is established through the ETHERNET protocol or the UMTS interface, through HTTP requests-web interface or through the DLMS/COSEM client.

On the other hand, there is Colombian patent application NC2017/0000390 that discloses an interface system and interconnection method to generate data compatible with an external system in a supply chain of oil and gas resources, and in particular with an interface and interface method to generate secure and verifiable data to avoid tampering, injection of unwanted data that results from unauthorized access along a supply chain, where an interface generates and transforms data in a supply chain of oil and gas for compatibility with external systems. Thus, the data collected is captured by an industrial control system, sensor or data collector, and transferred to a secure intermediate hardware platform to interface with a software component. The collected data is then modified using a business rules engine to create enhanced data and events created from the enhanced data.

Finally, in relation to the national state of the art in Colombia, there is document CO 09-078870 that mentions a system for detecting service interruptions in public utilities networks, which includes: a public utilities network that includes a product distribution to supply a product; a plurality of electronic utility devices associated with the utility network to monitor at least one parameter associated with the product distribution path; and a management processor in communication with the devices and operable to interrogate at least a subset of the utility electronic devices in response to an input to evaluate the performance of one of the utility network and the system in response to the information related to at least one parameter, evaluation includes a standards-based analysis of one of the parameter and information related to the parameter; capacity, and frequency hopping broadcast spectrum communication protocol capability.

Now, at an international level, there is document ES 1203511 that teaches a system that allows remotely carrying out the measurement of energy consumption of the users of a building, which is developed following a specific methodology that allows obtaining in addition to the reading, the real consumption in money that each user has had in a predetermined period, either short, medium or long, wherein the system also allows to establish alerts based on consumption that allow determining if there is a leak or fraud in some part of the installation.

Likewise, there is document SE 1650963 that is related to the field of reading measurements and discloses a method and an arrangement to provide measurements from a decentralized solution, wherein the disclosed system is adapted to have an improved redundancy in a more robust construction that provides additional functionality and comprises a detection unit, a collection unit and a central unit.

On the other hand, there is international publication WO 2018015822 related to an electronic system for remote reading of consumption meters, such as for water or gas supply, wherein the system comprises a photo-reading device installed in a meter, an electronic device for use by a user or operator and suitable for remotely communicating with the photo reader device, and wherein said electronic device communicates with the photo reader by radio in order to request that at least one photo reading of the numerical indicator of the meter be made and that said reading be sent to the electronic device. Likewise, an application installed on the electronic device controls the meter's identification code, and the reading is compared against a user code, and allows communication between the electronic device and the photo-reading device if the meter's identification code corresponds to the user code.

Finally, in the state of the art there is document EP 3163311 that discloses an apparatus and a method for remotely configuring gate devices in an AMI (Advanced Metering Infrastructure) network based on gates, where the remotely configurable gate devices are provided for Internet Protocol (IP) communications between consumption metering devices and a central utility facility. Thus, communications between the gate device and the central facility may be by wired or wireless communications and may include broadcasting configuration information from the central facility to selected gate devices.

In accordance with the above, and taking into account the devices, equipment or systems related to the management of the measurement of public services, existing in the state of the art, there is a problem related to the fact that the measurement solutions that currently exist in the market are not interoperable in terms of managing different brands of meters, nor do they have the ability to manage other meters through communication means other than those of their own brand, which implies that there is management software, a concentrator and a few meters for each brand that you may use, which in turn means that if a public utility company wants to have more than one brand of meters in AMI systems (Advanced Metering Infrastructure), it must have the same number of hub brands and therefore the same number of software, which makes operation difficult due to the fact that the information will come from many sources and each one with its own format, additionally, the costs rise, because since the concentrators of one brand are not able to read the meters of another brand, the amount of inventory of different equipment that must be taken into consideration is multiplied, in order to maintain an adequate level of response with customers in the event of failures in the measurement equipment of any of the brands. Finally, smart energy measuring systems are different from smart water and gas measuring systems, that is, they are not integrated, which means that the company must have more software available, more inventory, more sources of information, more costs, etc.

In this way, an expert in the field can clearly see that there is a need to design and implement a device, equipment or system that allows supplying a data concentrator that in turn allows the reading of different communication protocols, such as used by different brands of meters, which can be embedded in the equipment and additionally which has multiple communication modules, which aim to provide different alternatives to PUCs.

SUMMARY OF THE INVENTION

The present invention is directed to a device that corresponds to a modular concentrator, which allows making the connection between meters of public utilities, such as water, energy or gas, and a central control management station of said services, which is located in the Public Services Company (PUC), as such, wherein the device is mainly composed of a main processing module and a plurality of expansion modules that are serially connected with the main processing module, wherein each expansion module corresponds to a communication module with a defined protocol, this in order to obtain a single device that is capable of carrying out communication between different public utilities meters (independent of its brand and communication protocol) and the central station where the management software is located in the PUC.

Thus, the device of the invention has elements that allow the proper operation of the main processing unit or module, within which there is a processor, a series of memories, a battery for autonomy, and some communication elements which allows having a wireless or wired communication with the PUC's central station.

Additionally, the present invention relates to a process for collecting measurements from multiple utility meters, which are managed and stored in the concentrator device disclosed herein, to later be delivered, in a single format, to the management and operation software located in the PUC.

In addition, the modular concentrator device can be used to read different communication protocols, so that data can be obtained from different utility meters.

BRIEF DESCRIPTION OF THE FIGURES

The present invention is understood more clearly from the following figures where the components associated with the present device are shown, as well as the novel elements with respect to the state of the art, wherein the figures are not intended to limit the scope of the invention, which is solely given by the appended claims, wherein:

DETAILED DESCRIPTION OF THE INVENTION

Figure 1:
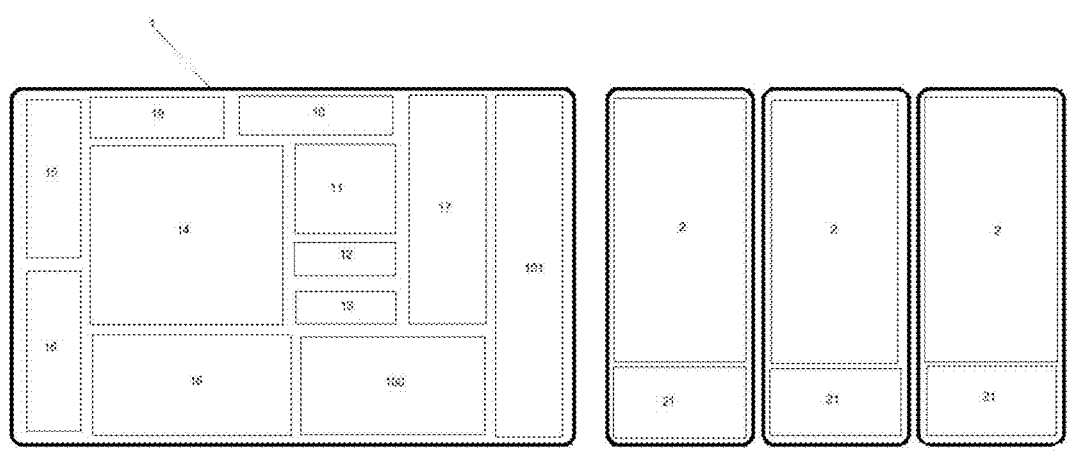
FIG. 1 corresponds to a general block diagram of the modular device of the present invention, which includes, in an exemplary way, three additional communication modules, with different technologies or protocols.

In order for a person skilled in the art to better understand the scope and spirit of the present invention, some of the terms used throughout this document will be defined below.

As used herein, the term "Non-Interoperability" in measurement systems refers to the condition of not being able to manage different brands of meters in a single solution through a single management software.

As used herein, the expression "PUC" or "Public Service Company" refers to a company that provides a plurality of public services to a community, where said company can be a provider of energy, water, gas, or other utilities, or any combination thereof.

As used herein, the expression "AMI" or "Advanced Metering Infrastructure" refers to an international standard system that allows the measurement, collection and analysis of data from a public utility, and is associated and interacts with smart meters of some public utilities, such as energy, water or gas.

Thus, the present invention defines a modular device that corresponds to a data concentrator for public utilities measurement systems, which has a main section (1) and a series of expansion modules (2) that directly depend on the type of communication to be had with each different brand of public utility meter, where the public utility to be measured can be energy, water or gas, or a combination of these.

In this sense, the modular device of the present invention is mainly composed of the following components or parts:
A processing unit or main module (1) composed of:
  A memory (11), such as a RAM memory;
  An embedded flash memory (12), such as an eMMC memory;
  An external memory (13), preferably of the microSD type;
  A processor (14);
  A wired communication module (15), preferably of the Ethernet type;
  A wireless communication module (16), preferably of the Wi-Fi type;
  A battery (17), preferably of the rechargeable type, such as lithium that can supply a voltage between 0 and 5V, preferably 3.7V, in order to comply with the last gasp protocol, which creates the relevant event log and follows a safe shutdown process to take care of the device memory and not alter or corrupt the stored data;
  A reset interface, such as a RESET button, which can be manually activated in case of a malfunction that cannot be corrected remotely;
  A pair of serial communication ports (18), such as RS-485, where up to 31 public utilities meters can be connected to each of said communication ports for their corresponding reading;
  An opening sensor (19) of the device, which is used to detect intruders or to record maintenance events of the container of the concentrator device;
  An external electrical power supply port (10) to the device to avoid heating problems or electromagnetic noise generation that may create conflict in the communication process with the meters, wherein said power corresponds to a 12V, 3 Å source;
  Some operating indicator elements (100), preferably a series of Light Emitting Diodes (LEDs) that in turn serve as feedback with the user, within which there is a status LED, which lights up in different colors (red, blue and green) depending on the status of the operating mode thereof (failure/fraud, maintenance, normal); some LEDs that show the operation of the expansion modules and the communication methods;
  A connection port (101) with expansion modules (2), which allows multiple expansion modules (2) to be connected to the main module (1), in order to have different functionalities or types of communication that are not absolutely necessary for the correct operation of the electric meter reading process, wherein said connection port also allows serial or I2C communications with different peripherals, together with the sending of digital signals for programming or configuring the connected module;
  A plurality of expansion modules (2), connected to the main module (1) by means of the connection with expansion modules (101), wherein each of the plurality of expansion modules (2) has status display elements (21), preferably LEDs, which only allow showing the operating status of the module, and wherein each expansion module (2) allows communications with utility meters through different protocols, such as GPRS modules, 3G, ZigBee, XBee, among others.

Thus, as illustrated in FIG. 1, the device of the present invention corresponds to a completely modular unit, which has a main module (1) where the most important components are located and that allow connection with the remote control center, where the databases are kept, where the utility management software is located and where the communication protocols of each of the different brands of integrated meters are embedded, wherein to said main module (1) additional or expansion (2) modules are connected, depending on the brand and technology used by each utility meter (such as energy, water or gas), in order to establish a single connection between the different meters and the PUC's control center.

Figure 2:
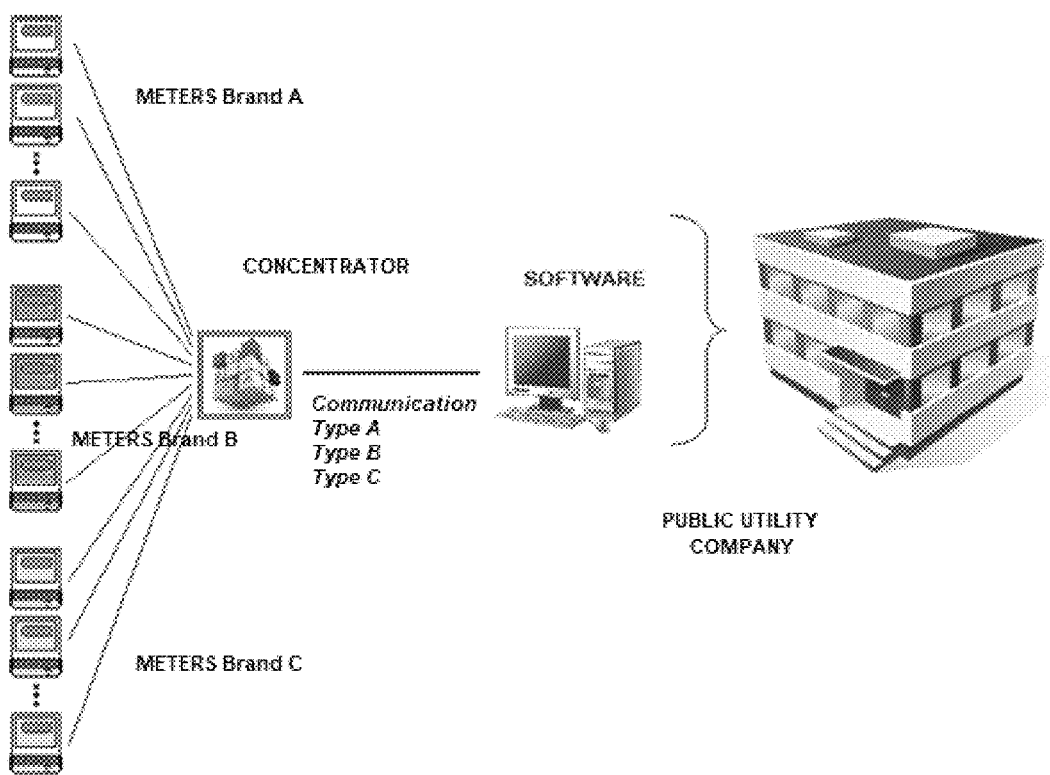
FIG. 2 corresponds to a general diagram of a measurement system for a PUC using the modular device (concentrator) of the present invention, where the different meters with different brands, the concentrator, the management software and the Public Utilities Company are shown.

Now, in relation to FIG. 2, it illustrates the general structure of a communication system and public utilities management of a PUC, which includes a modular concentrator device, which is shown in the central part of the figure and corresponds to the element that allows the connection of communications between each of the meters (of different brands and/or of different public utility) and the computer system that has the public utility management software in the PUC (shown on the right side of the figure), where it can be clearly seen that in this example three different brands of meters (A, B, C) are presented, each one with a different communication protocol, wherein each meter (from A, B or C) is connected with the concentrator device of the present invention, and the latter finally directly connects with the computer system that has the public utility management software, which corresponds to a considerable advantage for the PUC, since it does not need to have inventory for communications from different meters, while it does not require multiple connection devices or multiple management software, as indicated earlier in this document.

On the other hand, the management of the concentrator modular device, together with its peripherals and associated meters, is carried out through a web application that allows the configuration of all its parameters. The Web application has different sections, such as management (roles, policies, users, Country, Department/State, City, Company), configuration (Servers, Substations, Circuits, Transformers, Boxes, Concentrators, Meters, Clients), processes (Read on demand, Suspend/Reconnect, Current Limit, Maintenance Schedule, Back-up, Data Upload, Firmware Update, System Update) and queries (Readings, Event Log, Alarms, Errors, Log).

Now with regard to the operational advantages of the present invention, they are presented and are based on the fact that there being a single management software, it is guaranteed that all the information is in the same database without having to do control maneuvers. format version, which in the day-to-day running of a public utilities company (PUC) streamlines the data management process and eliminates the human errors that frequently occur when information from different sources must be manipulated. In the economic aspect, the benefits are very important, since unlike what takes place today wherein it is necessary to have an inventory of the different brands of meters, since one brand is not compatible or does not along with the other (as indicated above), with the modular and interoperable data concentrator device for AMI measurement systems of the present invention it is not required to have as much inventory of meters of each of the brands being used, since the concentrator device is in capacity to read any brand that is integrated into your system. Additionally, the response times of the crews in the field are reduced, since with any meter that they have available, they will be able to address a problem that arises. Finally, an additional and very important advantage and benefit is that as new brands of meters are required, with new functionalities, these can be integrated, even in already installed concentrators, since with a remote firmware update, concentrator devices that are installed in a complete system of control and management of public utilities can be updated.

In an alternative embodiment, the device of the present invention can be coupled to an internet system or network in order to be used in what is called the Internet of Things (IoT), and in this way to be able to associate the hub device with other electrical appliances or devices that can be found within a location (either home or commercial) and thus, have control or measurement over them, creating a complete monitoring network.

In the same way, the device of the present invention may also additionally and alternately include a device for additional signals, in order to have a broader control and monitoring, where said signals can be selected from the group that consists, without limitation, temperature, humidity, solar radiation, etc.

Figure 3:
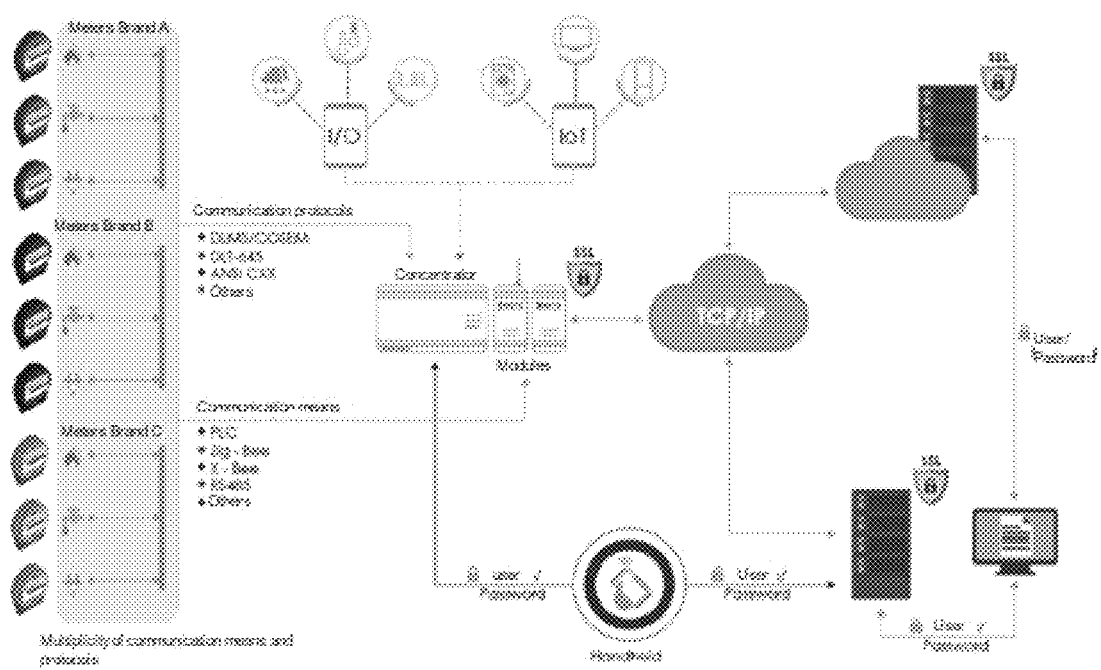
FIG. 3 corresponds to a general diagram of an additional alternative modality of a measurement system for a PUC using the modular device (concentrator) of the present invention, where additional elements are included to include the Internet of Things (IoT), as well as additional signals for broader monitoring and hub management from the remote end server or client.

In addition to the above, the present invention also provides a process to manage the data received in the concentrator device from a plurality of utility meters (energy, water or gas), independent of their communication protocol and/or their brand, as illustrated in FIG. 3, in order to define the functions of the concentrator device, as previously defined, and the fulfillment of the system demands required by the end user, that is, the Public Utilities Company, where said processes are explained in detail below according to what is illustrated in the flow diagrams, emphasizing the most outstanding aspects and those with the greatest impact in the multiple reading and interpretation of various brands of meters, which is the main objective of the present invention.

Figure 4:
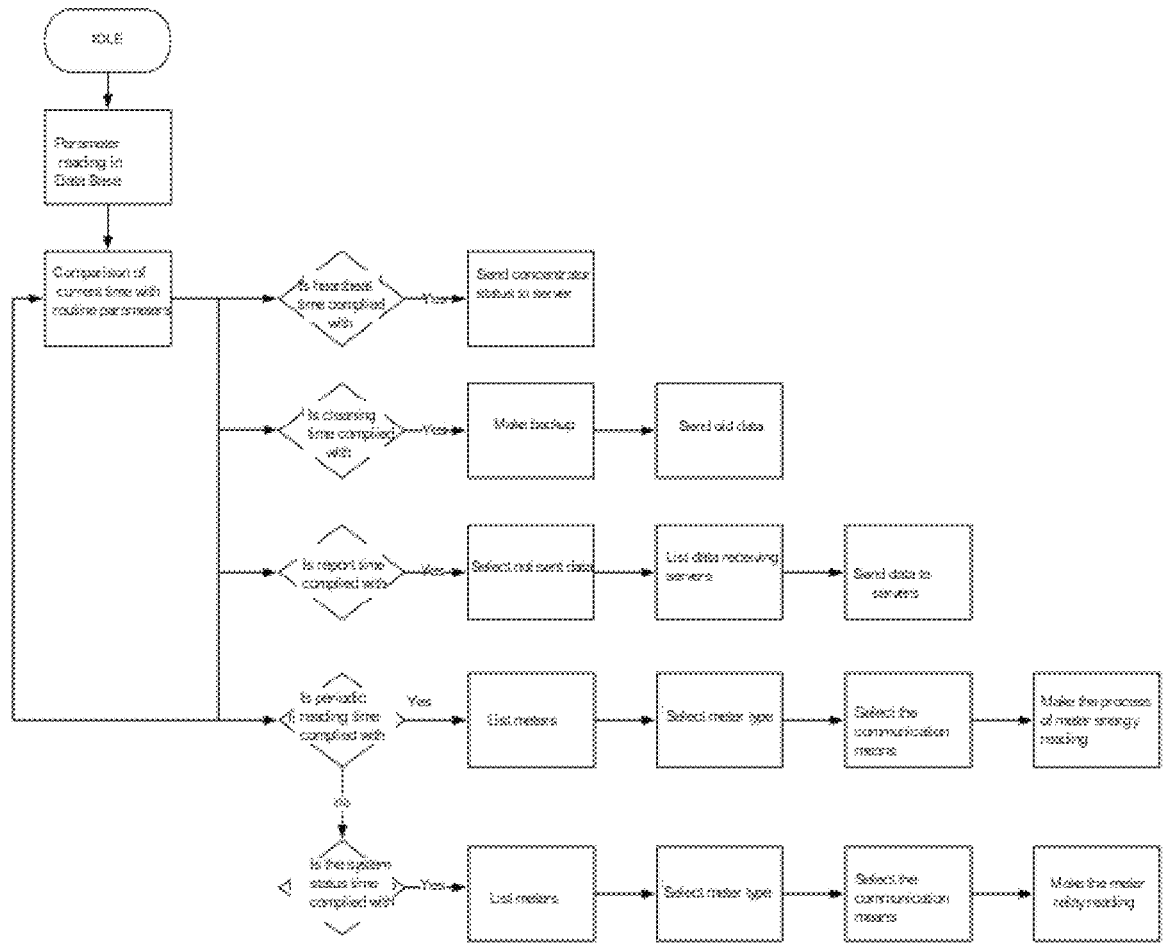
FIG. 4 corresponds to a flow diagram that explains in detail the steps that must be carried out in order to carry out the process of the present invention in the modular concentrator device, previously defined in FIG. 1.

Thus, the process of the present invention, as defined and illustrated in FIG. 4, is an infinite cycle continuously in execution providing the availability of the functionalities of the equipment or device 24/7 hours/days, wherein the implementation and execution of this process makes the solution offered as an alternative in this document viable.

In this way, the main process illustrated in FIG. 4 begins with the reading of the parameters in a database, where these parameters obey the system configurations and provide the necessary characteristics for the proper execution of the process in the device of the invention giving the possibility of evaluating the availability of the concentrator, establishment of information cleaning times, appropriate evaluation and setting of dates and hours, as a pre-establishment of reading report times configured prior to the start of the system in the database, among others features, where said features are editable depending on the required needs.

Then, the process includes the step of carrying out the comparison of the current time with the parameters of the routines, evaluating whether the current time is a multiple of the hours in which it has been pre-established to execute the different routines, based on the obtained result obtained the execution or not of the established routines is granted. In addition, there is a cleaning routine whose objective is not to store data without added value in the system, that is, whose use value expired, for which, given the specified time for this routine to start operating, a backup is made (commonly known in the related art as backup) of the information available at the moment by sending said information to the server configured in the concentrator as master and then deleting the information which is older than thirty (30) days counted backwards from the current date, this is due to the initial configurations made to the concentrator. Thus, upon completion of these process steps or tasks, the cleaning routine is terminated and it returns to the main cycle.

On the other hand, there is a routine time or Heartbeat that performs a simple but transcendental task and is to report on the operation from the concentrator to the server with the main objective that the server (user to whom the service is provided), generates an alert in the event of non-receipt of a report by the concentrator that was expected in a configured time. The foregoing, in an administrative way, allows observing, evaluating and attending to connection losses in a timely manner, generation of alerts in the event of the need for constant connection and user cases such as the uninterrupted report of meter readings to the providers of the supplied service (Energy, Gas, Water).

In the same way, there are routines related to the time of reporting the hourly information or the measurement reading report, wherein these routines have as their objective the selection of data not reported to the servers, the selection of the objective servers of said information and subsequent sending the data; avoiding the queuing of the information and the possible loss thereof, for which functions were developed such that they allow the concentrator to know to which servers information has been properly delivered, in which cases there are difficulties and eventually carry out the retries of sending to the servers of interest.

Hereinbelow two routines of the process of the present invention will be explained that contain considerations of vital importance that allow multidisciplinarity in terms of interpretation of meters of various brands and versions on the market in the previously defined device, where the first case is that of a system status routine, with which the hourly report on the meters of interest is evaluated, and the second case is a periodic reading routine through which the various measurements provided by the meter in question are obtained, wherein said routines are similar in functionality but the final result being obtained differs and this is due to the interpretation of the frames necessary for communication with the meter in question, that is, the main key through which multiple readings can be performed at different meters, which have little or nothing in common.

In this sense, the two routines defined above fulfill the tasks of listing the available meters by making a call to the database where these meters are being evaluated for their availability with certain periodicity, then a selection is made of those that have responded adequately, the desired communication means is selected by setting the pre-established connection parameters when creating each meter in the database and then, for the case of the periodic reading routine, all the required meter readings are carried out and organized in packets of information that are sent to the server and interpreted. It is important to clarify that the sending of information (different energies) is done in encrypted form; in the case of system status, a reading is performed in order to diagnose the status of the meter and update said status in the database.

The invention claimed is:

1. A modular data concentrator device for use in a public services measuring system, the device comprising:
a processing unit or main module configured to:
control operation of the device and process data obtained from a plurality of public service meters in the public services measuring system to generate composite data in a single format, wherein the plurality of public service meters use a plurality of communication protocols that provide data in a plurality of formats, and
communicate, directly via a wired connection or wirelessly, the composite data to a remote control center of a public utility company (PUC); and
a plurality of modular expansion modules external to the processing unit or main module, the plurality of modular expansion modules being serially connected to the processing unit or main module via a connection port of the processing unit or main module, wherein the plurality of modular expansion modules comprises an expansion module corresponding to each one of the communications protocols and configured to communicate with meters having the corresponding communication protocol,
wherein the device is adaptable to interoperably communicate with the plurality of public service meters.

2. The modular device according to claim 1, wherein the processing unit or the main module comprises:
a memory;
an embedded flash memory;
an external memory;
a processor;
a wired communication module;
a wireless communication module;
a battery;
a reset interface;
one or more serial communication ports;
a connector for a box opening sensor containing meters;
an external power supply port to the device; and
one or more operating indicator elements.

3. The modular device according to claim 2, wherein the memory is RAM, the embedded flash memory is of the eMMC type, and the external memory is of the microSD type.

4. The modular device according to claim 2, wherein the wireless communication module is of the Wi-Fi type, and the wired communications module is of the Ethernet type.

5. The modular device according to claim 1, wherein each of the plurality of modular expansion modules comprises a status display element.

6. The modular device according to claim 1, wherein each of the plurality of modular expansion module can be selected from the group consisting of: communication modules with GPRS, 3G, 4G protocol servers, communication modules with other ZigBee protocol concentrators, and communication modules with XBee, PLC, LoRa, 6LowPAN protocol meters.

7. The modular device according to claim 1, wherein the reset interface is a reset button.

8. A method for managing data received from utility meters to a concentrator device, the method comprising the steps of:
a) reading routine time parameters of routines to be executed by the concentrator device from a database, the routine time parameters comprising pre-established reading times, system status times, heartbeat times, cleaning times, and reporting times;
b) comparing current system time with the routine time parameters;
c) if the current system time meets the pre-established reading times, listing the meters, selecting a type of the meters, selecting a communication module corresponding to the selected type, and performing a meter profile reading process;
d) if the current system time does not meet the pre-established reading times, checking if the system status time is fulfilled;
e) if the current system time meets the system status times, listing the meters, selecting a type of the meters, selecting a communication module corresponding to the selected type, and performing a meter relay status reading process;
f) if the current system time meets the heartbeat times, sending a status from the concentrator device to a server;
g) if the current system time meets the cleaning times, making a backup of data stored on the concentrator device, and deleting old data from the data stored on the concentrator device;
h) if the current system time meets the reporting times, selecting unsent data, listing servers that receive data from the concentrator device, and sending the unsent data from the concentrator device to the servers;
i) if the current system time meets the system status times, listing the meters, selecting a type of the meters, selecting a communication module corresponding to the selected type, and performing hourly reading of the selected type of the meters.

\* \* \* \* \*